3,208,550
VIBRATOR CONTROLLING SYSTEM
Alain Castanet, Rueil-Malmaison, and Michel Lavergne, Le Vesinet, France, assignors to Institut Francais du Petrole, des Carburants et Lubrifiants and Compagnie Generale de Geophysique, Paris, France
Filed Dec. 20, 1962, Ser. No. 246,037
Claims priority, application France, Dec. 30, 1961, 883,602
3 Claims. (Cl. 181—.5)

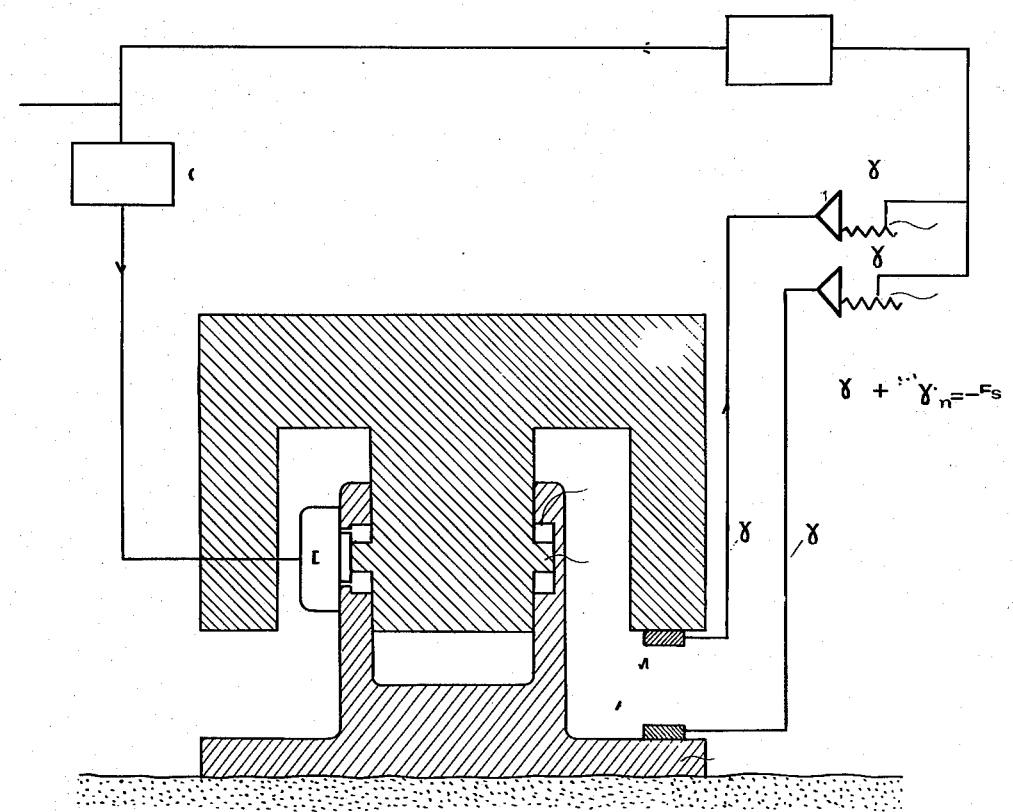

This invention relates to a complete vibrator controlling system by means of which the force imparted to the earth by the vibrator is kept proportional to the controlling signal, whatever the nature of the ground.

Such a vibrator for imparting to the earth a force which is proportional to a controlling signal, has already been described in a copending application entitled "Fluid Actuated Vibrator," filed on July 23, 1962, under Serial No. 211,767 assigned to the same assignee as the present application.

In this application there is particularly described a fluid actuated electrically controlled vibrator for seismic prospecting comprising a pulsing plate positionable upon a surface, a hydraulic jack and resilient means mounted upon said pulsing plate, a mass heavier than said pulsing plate and supported upon said hydraulic jack and said resilient means, a servo-distributor for fluid under pressure operatively connected to said hydraulic jack and actuated by an electric control signal, and a feedback circuit including means for detecting an electric signal proportional to the pressure difference exerted on said hydraulic jack, and means for adding said latter signal to the electric control signal actuating said hydraulic jack.

This electric signal is provided by conventional pressure transducers located in the body of the hydraulic jack.

However, this controlling system is only efficient where the admittance of the earth (defined as the ratio of the rate of the earth displacement just under the pulsing plate by the force exerted on the earth) is relatively low, i.e., in the case where the earth surface is not too loose.

As a matter of fact, in the case of a loose earth (of high admittance) the resonance frequency of the assembly of the pulsing plate and the earth may be within the range of the useful frequencies.

It is therefore an object of this invention to provide a vibrator with an automatic controlling system by means of which the force imparted to the earth is kept strictly proportional to a controlling electrical signal.

It is another object of this invention to maintain this proportionality whatever may be the admittance of the earth.

It is a further object of this invention to provide such an automatic controlling system which may be operatively associated to any electrically controlled vibrator and not only to those vibrators of the fluid actuated type.

Still other objects and advantages of this invention will be appreciated upon consideration of the following specification and the accompanying drawing, which constitutes a part of said specification and the figure of which illustrates, by way of non-limitative example a fluid operated vibrator provided with an automatic control system according to this invention.

This fluid operated vibrator comprises essentially a light base or pulsing plate $p$ in contact with the earth surface and a heavy mass $M_0$ supported upon said pulsing plate by a hydraulic jack controlled by a conventional servo distributor D of fluid under pressure and optionally resilient means comprising one or more springs for counteracting the weight of the mass $M_0$ (not shown on the figure but described in the co-pending application, supra). In the case where no resilient means are used, the weight of the mass $M_0$ is counterbalanced by a constant pressure applied on the lower face of the jack piston K.

The servo distributor D is actuated by means of an electric control signal E after amplification thereof by amplifier $A_d$.

The hydraulic jack comprises a piston K rigidly mounted on the mass $M_0$, and a cylinder C integral with the pulsing plate $p$. To the pulsing plate $p$, in contact with the earth surface, is therefore applied the total weight of the mass $M_0$, the hydraulic jack and the pulsing plate itself.

There will be designated by M the mass of the assembly consisting of the mass $M_0$ and the piston K secured thereto, and by $m$ the mass of the assembly consisting of the pulsing plate $p$ and the cylinder C.

During the operation of the vibrator, the hydraulic jack generates at each moment two forces of equal magnitudes and opposite directions $F_k$ and $F_c$, applied respectively to the piston K and to the cylinder C.

The force $F_k$ is equal to the inertia force of the mass M and the force $F_c$ is equal to the sum of the inertia force of mass m and the resistance of the earth $F_s$.

Designating $\gamma_M$ and $\gamma_m$ as the respective accelerations of masses M and $m$, there may be written:

$$F_k = M\gamma_M$$
$$F_c = m\gamma_m + F_s$$

Since $F_c = -F_k$, there is obtained the following equation:

$$M\gamma_M + m\gamma_m + F_s = 0$$

The automatic control system by feedback according to this invention is carried out by means of electrically measuring the force $F_s$ imparted to the earth as represented in absolute value by the sum of the inertia forces $M\gamma_M$ and $m\gamma_m$, amplifying the measuring electric value in amplifier $A_e$ and supplying the resulting signal to the inlet of amplifier $A_d$.

Designating G as the gain of the amplifier $A_d$ and $\beta$ the gain of the amplifier $A_e$, the well known following relation between the force $F_s$ and the voltage E is observed when $\beta G$ is much higher than 1 (i.e., when 1 is negligible as compared to the value of $\beta G$):

$$kF_s = -\frac{1}{\beta}E$$

which relation expresses the relationship between $F_s$ and E inasmuch as the value of $\beta$ is constant and no phase displacement is introduced by amplifier $A_e$ within the range of the useful frequencies.

The electrical value measuring the force $F_s$ is obtained by changing the sign of the sum of the inertia forces $M\gamma_M$ and $m\gamma_m$, derived respectively from the accelerations $\gamma_M$ and $\gamma_m$ measured by means of two accelerometers $A_M$ and $A_m$ of conventional type secured respectively to the mass $M_0$ and to the pulsing plate $p$, said accelerations being multiplied by weighting coefficients proportional to the values M and $m$, by means, for instance, of potentiometer means.

The accelerometers $A_M$ and $A_m$ may be associated, for example, to amplifier-impedance compensators $G_1$ and $G_2$, in combination, respectively, with potentiometers $P_1$ and $P_2$ by adjustment of which the acceleration values $\gamma_M$ and $\gamma_m$ are respectively multiplied by coefficients proportional to M and $m$.

Inasmuch as $\beta G$ is very high, $\beta$ is constant and no phase displacement is introduced by amplifier $A_e$ within the range of the useful frequencies, a proportionality is maintained between $F_s$ and E, i.e. the force imparted to the earth is strictly proportional to the controlling signal, whatever may be the admittance of the earth.

Whereas the automatic control system according to this invention has been described in association with a fluid operated vibrator, it may as well be used for operating any other type of vibrator comprising a pulsing plate and a heavy mass supported by said pulsing plate through the intermediary of any elastic system, provided that the movement of said mass may be electrically controlled.

It will be understood that this invention is susceptible to modifications in order to adapt it to different usages and conditions and, accordingly, it is desired to comprehend such modifications within the invention as may fall within the scope of the appended claims.

What is claimed as this invention is:

1. An electrically controlled vibrator comprising a pulsing plate in contact with the earth, a heavy mass, an elastic system supporting said heavy mass and taking its bearing on said pulsing plate, means for controlling the movement of said mass, responsive to electric control means, a source of electric controlling voltage feeding said electric control means, means for producing an electric voltage proportional to the force imparted to the earth by said pulsing plate, comprising means for summing with a changed sign two electric signals respectively proportional to the inertia forces of said mass and said pulsing plate, and for amplifying the resulting sum, and means for feeding back said last-mentioned electric voltage to said electric control means.

2. An electrically controlled vibrator according to claim 1, wherein said means for controlling the movement of said mass comprises a hydraulic jack and said electric control means comprises an electrically actuated servo-distributor.

3. An electrically controlled vibrator comprising;
    (a) a pulsing plate in contact with the earth;
    (b) a heavy mass;
    (c) an elastic means bearing on said pulsing plate and supporting said heavy mass;
    (d) means responsive to electric control means to control the movement of said heavy mass;
    (e) electric control means including a source of electric controlling voltage;
    (f) a first accelerometer mounted on said heavy mass and producing a voltage proportional to the acceleration of said heavy mass;
    (g) a second accelerometer mounted on said pulsing plate and producing a voltage proportional to the acceleration of said pulsing plate;
    (h) potentiometer means connected to said accelerometers and multiplying said voltage of (f) and (g) by a coefficient proportioned to said heavy mass and said pulsing plate respectively;
    (i) means connected to said potentiometer means to sum said voltage of (f) and (g) with a changed sign multiplied by said coefficient; and
    (j) means for amplifying the resulting sum of (i) and feeding back to said electric control means (e).

References Cited by the Examiner
UNITED STATES PATENTS

| | | | |
|---|---|---|---|
| 2,470,099 | 5/49 | Hall | 91—363 |
| 2,853,667 | 9/58 | Booth et al. | 73—71.6 X |
| 2,955,460 | 10/60 | Stevens et al. | 91—275 |
| 3,038,451 | 6/62 | Sporn et al. | 91—361 |
| 3,106,982 | 10/63 | Wade | 181—.53 |

SAMUEL FEINBERG, *Primary Examiner.*

CHESTER L. JUSTUS, *Examiner.*